United States Patent
Oh et al.

(10) Patent No.: US 7,830,817 B1
(45) Date of Patent: Nov. 9, 2010

(54) VOCODER SELECTION BASED ON LOCATION OF CLIENT DEVICE

(75) Inventors: Dae-Sik Oh, Overland Park, KS (US); Mark Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 302 days.

(21) Appl. No.: 11/951,017

(22) Filed: Dec. 5, 2007

(51) Int. Cl.
*H04J 1/16* (2006.01)
*H04J 3/14* (2006.01)
*H04L 1/00* (2006.01)
*H04L 12/26* (2006.01)
*H04L 12/28* (2006.01)
*H04L 12/16* (2006.01)

(52) U.S. Cl. .................................... 370/252
(58) Field of Classification Search ............... 370/338, 370/335, 328, 356, 429, 442, 229, 341, 253, 370/252, 352, 468, 522; 455/453, 69, 450, 455/436, 447, 452, 451, 560, 550, 551, 517, 455/522, 561; 375/222, 227, 341; 379/1, 379/9, 28; 714/795, 789

See application file for complete search history.

(56) References Cited

U.S. PATENT DOCUMENTS

| | | | | |
|---|---|---|---|---|
| 5,603,096 A * | 2/1997 | Gilhousen et al. | ............. | 455/69 |
| 5,796,757 A * | 8/1998 | Czaja | .......................... | 714/789 |
| 5,812,938 A * | 9/1998 | Gilhousen et al. | ............. | 455/69 |
| 6,463,097 B1 * | 10/2002 | Held et al. | .................. | 375/225 |
| 6,697,375 B1 | 2/2004 | Meng | | |
| 7,397,425 B2 * | 7/2008 | Ranta et al. | .................. | 342/374 |
| 2002/0183066 A1 * | 12/2002 | Pankaj | .......................... | 455/453 |
| 2004/0125777 A1 * | 7/2004 | Doyle et al. | ................. | 370/338 |
| 2004/0185870 A1 * | 9/2004 | Matsuda | ................... | 455/456.1 |
| 2007/0053412 A1 | 3/2007 | Hashimoto et al. | | |
| 2007/0109974 A1 * | 5/2007 | Cutillo et al. | ................ | 370/254 |
| 2008/0043681 A1 * | 2/2008 | Vimpari et al. | .............. | 370/335 |
| 2009/0111506 A1 * | 4/2009 | Laroia et al. | ............. | 455/550.1 |

FOREIGN PATENT DOCUMENTS

JP 2002101440 4/2002

* cited by examiner

*Primary Examiner*—Pankaj Kumar
*Assistant Examiner*—Prenell P Jones

(57) ABSTRACT

Methods and systems for selecting data rates are described in a wireless network. The distance between a client and a base station serving the client device is determined. Based on that distance, a minimum threshold data rate is selected such that a larger distance corresponds to a higher minimum threshold data rate and a smaller distance corresponds to a smaller minimum threshold data rate. An actual data rate, not less than the minimum threshold data rate, is then selected, and signals are transmitted between the client device and the base station at the actual data rate. The actual data rate may be increased if there exists unused available bandwidth in the network. Events such as a change in distance or a timer expiring may result in a recalculation of the minimum threshold data rate.

18 Claims, 3 Drawing Sheets

FIGURE 1

VOCODER SELECTION BASED ON LOCATION OF CLIENT DEVICE

BACKGROUND

Wireless communications networks allow users to communicate over an air interface through the use of client devices. In a typical wireless network, a radio access network ("RAN") facilitates client devices communicating over the air interface. A RAN may be communicatively coupled to other types of networks, such as the public switched telephone network ("PSTN") or a packet switched network like the Internet. The connectivity between these networks allows users of client devices to engage in many different types of communications, including telephone calls with cellular telephones, telephone calls with landline telephones, and the transmission or receipt of electronic mail messages.

A RAN may include, among other components, base transceiver stations ("BTSs"), radio network controllers ("RNCs"), and switches or gateways, such as mobile switching centers ("MSCs") and packet data serving nodes ("PDSNs"). A BTS, also known as a base station, comprises a cell tower with one or more antennas that radiate to define a cell and cell sectors. A BTS may serve client devices within the geographic coverage area corresponding to its cell, such that client devices within that area receive signals from and transmit signals to the BTS. An RNC may control one or more BTSs and thus control various aspects of air interface communication. An RNC may also route communication signals from BTSs to other networks. For instance, the RNC may route communications to an MSC, which may provide connectivity with the PSTN. Similarly, the RNC may route communications to a PDSN, which may provide connectivity with the Internet or other packet switched network.

A vocoder is a network component that may encode signals to be transmitted by an entity and decode signals that have been received by the entity. In a typical wireless communication network, an RNC and a client device may each have its own vocoder. The vocoder of a client device may digitize, compress, or otherwise encode a voice signal received from a user for transmission over an air interface to a BTS. The BTS may relay the signal from the client device to the RNC, and the vocoder of the RNC may decode the encoded voice signal. The RNC may then send the decoded representation of the voice signal to a network switch or gateway for transmission to another endpoint. If the RNC receives a signal from a remote device to be transmitted to the client device, the vocoder of the RNC may encode that signal. The RNC may then transmit the encoded signal through the BTS to the client device, and the vocoder of the client device may then decode the signal so that the signal may be communicated to the user of the client device.

Vocoders in wireless wide area networks, such as the RANs described above, commonly use a number of different compressed digital formats, which are well known to those of ordinary skill in the art, to encode and decode signals transmitted over an air interface. One exemplary format is the Enhanced Variable Rate Code ("EVRC"), which supports voice transmission at a data rate of about 8 kbps. EVRC is described in the TIA/EIA/IS-127-3 standard. "Enhanced Variable Rated Codec, Speech Service Option 3 for Wideband Spread Spectrum Digital Systems." Another example is the Selectable Mode Vocoder ("SMV"), which supports voice transmission at a data rate of about 4 kbps. SMV is described in the TIA/EIA/IS-893 standard, "Selectable Mode Vocoder Service Option for Wideband Spread Spectrum Communication Systems." Only requiring about half the bandwidth of EVRC, SMV is a higher compression format than EVRC. Wireless devices that support the SMV format are typically backward compatible; thus, these devices likely support the less efficient EVRC format as well as the SMV format.

OVERVIEW

Methods and systems are described herein for the selection of data rates, such as vocoder data rates, in a wireless network. Exemplary embodiments contemplate the selection of vocoder data rates, which may be used for the encoding, decoding, and transmission of signals between a client device and a BTS, based on the distance separating the client device from the BTS.

An exemplary system supports the selection of a data rate based on the distance separating a client device from a base station serving the client device. This system comprises a client device and a RAN that includes a base station serving the client device and an RNC serving the base station. The client device has a first vocoder, and the RNC has a second vocoder and logic configurable to manage aspects of air interface communications. The first vocoder encodes signals to be transmitted by the client device and decodes signals received by the client device, and the second vocoder encodes signals to be transmitted by the base station and decodes signals received by the base station.

The logic of the RNC is configured to direct the RNC to perform multiple operations. For instance, the RNC may determine a distance between the client device and the base station. The RNC may then use this determined distance in the selection of a minimum threshold data rate, which is a minimum rate below which a particular data rate, such as a vocoder data rate, should not fall, and actual data rates, which are the rates actually being used to transmit signals over the network.

After determining the distance, the RNC may select a minimum threshold data rate in accordance with an algorithm. The algorithm may correlate distance values, such as a first value and a second value, to data rate values, such as a first data rate and a second data rate, where the second value is greater than the first value when the second data rate is higher than the first data rate. According to the algorithm, the RNC may then set the minimum threshold data rate to the first data rate value if the distance corresponds to the first value and to the second data rate if the distance corresponds to the second value. The logic may further dictate that the RNC select a first actual data rate and a second actual data rate, both actual data rates being not less than the minimum threshold data rate. The RNC may then direct the first vocoder to transmit signals from the client device to the base station at the first actual data rate and direct the second vocoder to transmit signals from the base station to the client device at the second actual data rate.

An exemplary method, also described herein, allows for the selection of a data rate based on a distance separating a client device from a base station serving the client device. The steps of the method may be performed by the RNC serving the base station or by another network entity. The method first involves determining the distance between a client device and a base station serving the client device. The method may then dictate the selection of a minimum threshold data rate in accordance with an algorithm. The algorithm may correlate distance values and data rate values as described above. The method may then direct the selection of an actual data rate so that the actual data rate is not less than the minimum threshold data rate. After selection of the actual data rate, signals may be transmitted between the client device and the base station at the actual data rate.

The exemplary method allows for any appropriate process to be employed to determine the distance between the client device and the base station. For instance, either a return time delay method or a satellite-based location determination method may be used to determine the distance.

After transmitting signals at an actual data rate, a wireless network may have excess capacity in the form of usable but unused bandwidth, and a preferred embodiment takes advantage of this capacity by increasing the actual data rate to use at least a portion of this available bandwidth. For example, an RNC or other network entity may increase the actual data rate if unused bandwidth is detected. Further adjustments may be made to the actual data rate if the usable bandwidth of the network changes. Specifically, if the usable bandwidth increases, the RNC may further increase the actual data rate. Alternatively, if the usable bandwidth decreases, the RNC may decrease the actual data rate with the condition that the actual data rate never has a value less than the minimum threshold data rate.

In other alternative embodiments, the RNC may first calculate the minimum threshold data rate when a client device is engaged in call setup and may recalculate the minimum threshold value at a later time. For instance, the RNC may recalculate the minimum threshold data rate after a timer, triggered to begin during call setup, has elapsed. Additionally, if the distance between the client device and the base station changes, or changes by more than a specified amount, the RNC may recalculate the minimum threshold data rate. If the client device has moved so that a new base station serves the client device, the RNC may recalculate the minimum threshold data rate, and if a new RNC serves the new base station, the new RNC may recalculate the minimum threshold data rate.

These as well as other aspects will become apparent by reading the following detailed description with reference, where appropriate, to the accompanying drawings.

DETAILED DESCRIPTION

Signals may degrade as they travel over the air interface, and this degradation may worsen as the distance that a signal must travel increases. Also, the higher the data rate used to transmit signals, the more information from the original signal is transmitted to a recipient of the signal, and higher data rates, by transmitting more information, correspond to higher quality received signals and in turn higher call quality. Therefore, in accordance with the exemplary embodiments, signals may be transmitted at a high data rate when a large distance separates a client device from a base station in order to overcome the likely degradation of those signals over the air interface. Correspondingly, signals are transmitted at a low data rate when a small distance separates a client device from a base station.

Network Configuration

Figure 1:
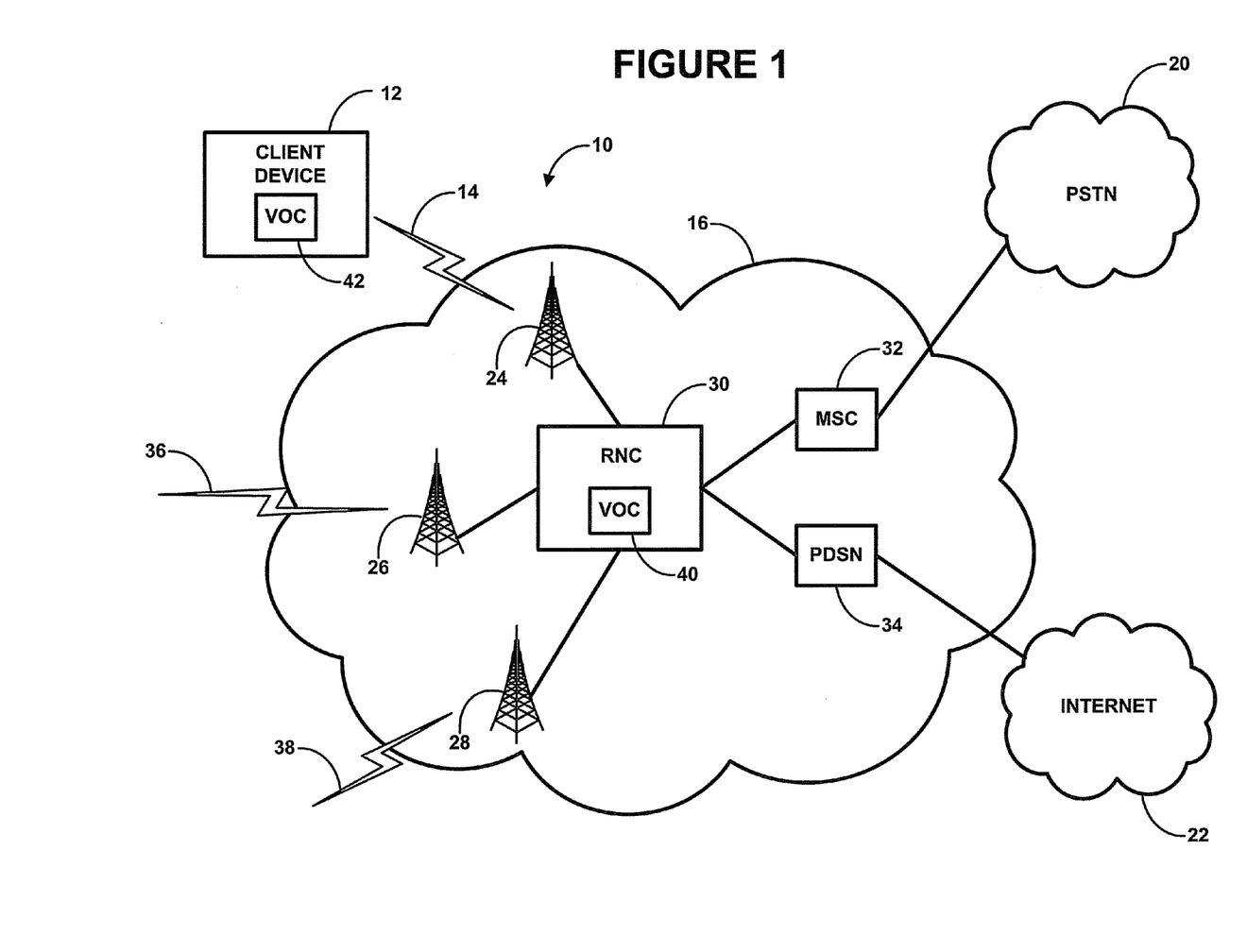
FIG. 1 is a block diagram of a system in which an exemplary embodiment may be implemented.

FIG. 1 is a block diagram of an exemplary network 10 that supports the selection of various data rates, such as a minimum threshold data rate and an actual data rate. This network configuration should not be taken to limit the invention; rather, the arrangement depicted in FIG. 1 is merely illustrative of an arrangement that allows the practice of the invention. In network 10, a client device 12 may be operable to communicate via an air interface 14 with a RAN 16, which may in turn provide connectivity with a PSTN 20 and with a packet switched network 22, here shown as the Internet.

RAN 16 may include, among other network components, BTSs 24, 26, and 28, RNC 30, and switches and gateways, such as an MSC 32 and a PDSN 34. BTS 24 may include a cell tower with one or more antennas that radiate to define air interface 14, over which client device 12 may communicate. Likewise, BTSs 26 and 28 may define air interfaces 36 and 38, respectively. Air interfaces 14, 36, and 38 may correspond to substantially separate geographic areas of wireless communications coverage and may be defined in terms of cells and sectors.

RNC 30 may control BTS 24, as well as BTSs 26 and 28, and various aspects of air interface communication. RNC 30 may also route signals between wireless devices, such as client device 12, and remote devices, including remote devices connected to other networks such as PSTN 20 and Internet 22. Switches and gateways may facilitate such inter-network communication. MSC 32, for example, may route communications from RNC 30 onto the circuit switched PSTN 20 and from PTSN 20 to RNC 30. A communication routed through MSC 32 may consist of, for example, a telephone call between a wireless device and a landline telephone. On the other hand, PDSN 34 may route communications from RNC 30 to Internet 22 and from Internet 22 to RNC 30. Communications routed through PDSN 34 may be, for example, email messages or telephone calls placed using Voice over Internet Protocol ("VoIP").

For instance, a communication path may exist between client device 12 and a remote landline telephone (not shown) connected to PSTN 20. A signal travelling this path may be transmitted from client device 12 over air interface 14 to BTS 24. BTS 24 may in turn transmit the signal to RNC 30. MSC 32 may then route the signal from RNC 30 to PSTN 20. Once the signal reaches PSTN 20, the signal may be transmitted to the remote landline telephone. A return signal from the remote landline telephone to client device 12 may travel the reverse path, from PSTN 20, through MSC 32, RNC 30, and BTS 24, and over air interface 14 to client device 12.

Similarly, a communication path may exist between client device 12 and a remote computer terminal (not shown) connected to Internet 22. A signal travelling this path may be transmitted from client device 12 over air interface 14 to BTS 24. BTS 24 may in turn transmit the signal to RNC 30. PDSN 34 may receive the signal from RNC 30, may covert the signal into data packets, if necessary, and may then route the packets to Internet 22. Once the packets reach Internet 22, the packets may be transmitted to the remote computer terminal. A return signal from the remote landline telephone to client device 12 may travel the reverse path, from Internet 22, through PDSN 34, RNC 30, and BTS 24, and over air interface 14 to client device 12.

At various stages along the communication paths described above, the signals transmitted may be encoded or decoded by vocoders of different network entities. For instance, as noted above, RNC 30 may include a vocoder 40 for encoding and decoding of voice signals to be transmitted or received by BTSs 24, 26, and 28, and client device 12 may include a vocoder 42 for encoding and decoding voice signals to be transmitted or received by client device 12.

Vocoder 40 of RNC 30 may digitize, compress, or otherwise encode voice signals received from remote devices into encoded voice signals to be transmitted over the air using BTSs 24, 26, and 28 to wireless devices, such as client device 12. Vocoder 40 may also decode encoded voice signals—for instance, signals sent by client devices to BTSs 24, 26, and 28 and transmitted to RNC 30—into decoded voice signals to be transmitted to other devices connected to network 10. Vocoder 40 may be configured to sample and encode voice signals at a specified data rate, and that specified data rate would be the same rate at which the encoded signal is later transmitted and decoded. Vocoder 40 may support multiple sampling, encoding, decoding, and transmission data rates. RNC 30 and vocoder 40 may be equipped with memory, logic, and processing power sufficient to implement embodiments of the invention.

Client device 12 may include vocoder 42, which may have functionality similar to that of vocoder 40. A user of client device 12 may be engaged in a call with a remote device, and thus the user may be speaking into client device 12. By sampling or otherwise recording the speech of the user, client device 12 may produce a voice signal that vocoder 42 encodes. The encoded voice signal may then be transmitted from client device 12, over air interface 14, to BTS 24, and BTS 24 may transmit the encoded signal to RNC 30. Before routing the signal through network 10 to the remote device, RNC 30 may use vocoder 40 to decode the encoded signal. RNC 30 may then route the decoded signal through network 10 to the remote device, perhaps along one of the communication paths described above.

Likewise, RNC 30 may receive a return voice signal from the remote device. Vocoder 40 may encode the return voice signal, and RNC 30 may transmit the encoded voice signal to client device 12 through BTS 24. When client device 12 receives the encoded voice signal, client device 12 may then use vocoder 42 to decode the encoded voice signal into a signal that may be played to the user.

It should be understood that the arrangements and methods described herein are provided for purposes of example only. As such, those skilled in the art will appreciate that other arrangements and other elements (i.e., machines, interfaces, functions, orders, and groupings of functions) may be used instead, and some elements may be omitted altogether. Further, many of the elements described herein are functional entities that may be implemented as discrete or distributed components or in conjunction with other components, in any suitable combination and location, or as any suitable combination of hardware, firmware, or software.

Figure 2:
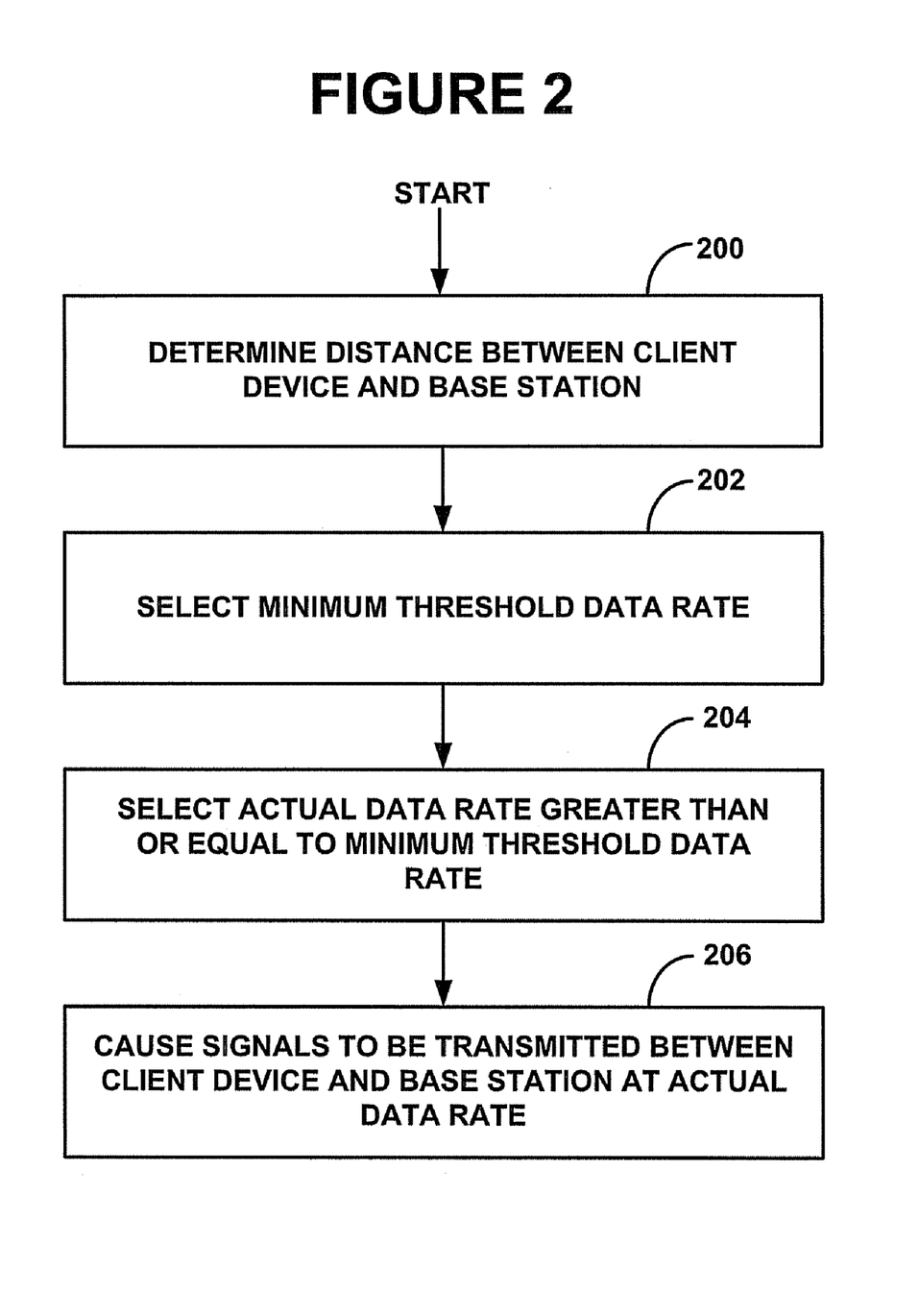
FIG. 2 is flow diagram depicting functions carried out in accordance with an exemplary method.

FIG. 2 is flow diagram of an exemplary method for selecting data rates. Each step is described in more detail below. For the purposes of illustration, the RNC will be assumed to be the entity performing most of the steps of the exemplary method. However, any appropriate network entity may perform the steps of this and other exemplary methods.

In step 200, the RNC may determine the distance between the client device and the base station serving the client device. The RNC may then select a minimum threshold data rate, in step 202, based on the distance determined in step 200. The RNC may then select an actual data rate in step 204 to be greater than or equal to the minimum threshold data rate. In step 206, the RNC may cause signals to be transmitted between the client device and the base station at the actual data rate selected in step 204. The act of a network entity detecting an attempt to set up a communication with the client device may trigger the performance of step 200 or any one of the subsequent steps.

Determining the Distance

Multiple methods may be used for the distance determination of step 200. By way of illustration, the distance determination will be explained using the arrangement shown in FIG. 1, and the determined distance may be the distance between client device 12 and BTS 24.

Return time delay is one method that may be used to determine the distance between the client device and the base station. In particular, RNC 30 may send, at a first time, a first message through BTS 24 and over air interface 14 to client device 12. After receiving the first message, client device 12 may send a second message, responsive to the first message, to RNC 30 and may transmit the second message to BTS 24 for delivery to RNC 30. RNC 30 may receive the second message at a second time. RNC may then take the difference of the first time and the second time to determine a return time. RNC 30 may then apply a known message transmittal rate, for example, a known rate at which a message travels a given distance over an air interface in network 10, to the return time to determine the distance between client device 12 and BTS 24.

Alternatively, a satellite method may be used to determine the distance between the client device and the base station. For instance, RNC 30 may send request for the position of client device 12 to client device 12, and the request may include identifiers of appropriate satellites from which client device 12 may obtain position information. After receiving the request, client device 12 may use the satellite identifiers to read transmissions from the appropriate satellites. Client device 12 may calculate its own position, according to known methods, using the information contained within the satellite transmissions. For example, client device 12 may receive transmissions from three separate satellites and may use trilateration to determine its position. Client device 12 may then transmit that position to RNC 30. RNC 30 may then compare the position of client device 12 to a known geographical position of BTS 24 to determine the distance between the client device and the base station.

Selecting the Minimum Threshold Data Rate and Setting the Actual Data Rate

Once the distance between the client device and the base station has been determined, the RNC may select a minimum threshold data rate in step 202. Assuming a known level of signal degradation over the determined distance, the minimum threshold data rate is the minimum data rate necessary to provide a desired level of call quality over that determined distance.

Call quality may depend on the amount of information that the entities engaged in a call may exchange with each other. For example, voice signals may pass between two users engaged in the call. If all of the information contained in the first user's speech could be represented in a voice signal that was transmitted to and received by the second user, that voice signal would correspond to the highest possible call quality because the second user would hear every word that the first user said. However, if only some subset of the information from the first user's speech, for example, every other word, were represented in a voice signal sent to or received by the other user, this voice signal would correspond to a lower call quality because the second user would hear less of what the first user said.

Call quality may therefore correlate to the data rate at which the signals constituting the call are encoded, decoded, transmitted, and ultimately received. For instance, at high data rates, more information from the original signal may be sampled, encoded, and transmitted as an encoded signal than would have been sampled, encoded, and transmitted at a lower data rate. Also, the recipient of an encoded signal only receives that information from the original signal that is included in the encoded signal. Therefore, at higher data rates, more information from an original signal may be received by the recipient of an encoded signal.

Additionally, call quality may correlate to the distance over which signals constituting a call must travel. For example, as the distance over which a signal must travel increases, the chance that the signal may degrade between when the signal is transmitted and when the signal is received also increases. Such signal degradation may correspond to the signal containing less information upon receipt than it contained upon transmission, and a received signal that has degraded in transit may be the equivalent an undegraded signal sent at a lower data rate. Therefore, signals that must travel over large distances may correspond to low call quality.

Low data rates and high distances may both typically correspond to low call quality. Therefore, it is preferable to select a high data rate when a large distance separates an entity transmitting a signal from an entity receiving a signal, so that, even assuming that the signal may degrade, the call may maintain a minimum level of call quality. Correspondingly, a low data rate may preserve the desirable level of call quality when the distance is relatively small because low levels of signal degradation may be expected for calls made at that distance. In exemplary embodiments, the relevant distance may be the distance separating a client device from the BTS serving the client device, and the relevant data rate may be a vocoder data rate.

Any algorithm that appropriately correlates data rate and distance may be used to select the minimum threshold data rate. For instance, any mathematical function that takes the distance as an input, yields the minimum threshold data rate as an output, and is monotonically increasing may be appropriate. Alternatively, a piecewise function that maps ranges of distance values onto minimum threshold data rate values may be appropriate as long as the minimum threshold data rate values increase as the distance values increase. With a piecewise function, distance values within a single range may map to the same minimum threshold data rate value; however, a smaller distance value may never map to a minimum threshold data rate value larger than the minimum threshold data rate value to which a larger distance value would map.

Yet another alternative algorithm for the selection of the minimum threshold data rate may not require any real-time calculation using the determined distance. Distance may be correlated to minimum threshold data rate in a look-up table or similar data array, such that minimum threshold data rate values increase as distance values increase. Such a table may be populated anytime before the minimum threshold data rate selection occurs, and the selection of a minimum threshold data rate may involve merely accessing the relevant table data.

After selecting the minimum threshold data rate, the RNC may select an actual data rate in step 204. Any algorithm may be used to select the actual data rate, provided that the actual data rate may not be less than the minimum threshold data rate. For example, if a vocoder is configured to only work at particular, preset data rates, the actual data rate selected may be the lowest preset data rate that is higher than the minimum threshold data rate. The actual data rate may also be equal to the minimum threshold data rate.

After selecting the actual data rate, the RNC may cause signals to be transmitted at the actual data rate in step 206. This step may involve only signals sent by the client device, only signals sent by the base station, or both. For example, the RNC may send a request to client device 12 to send signals at the actual data rate. After client device 12 receives such a request, vocoder 42 may responsively sample and encode voice input from a user at the actual data rate and may then cause the encoded signal to be transmitted at the actual data rate to BTS 24.

Alternatively, RNC 30 may cause signals that are to be transmitted to client device 12 to be sampled and encoded at the actual data rate. For example, RNC 30 may receive a signal from a remote device to be transmitted to client device 12. Vocoder 40 may then encode the signal at the actual data rate, and RNC 30 may cause the signal to be transmitted through BTS 24 to client device 12 at the actual data rate.

A signal encoded at a particular data rate should be decoded at that same data rate; however, two signals traveling in opposite directions, such as two signals that together constitute a telephone call, may be transmitted at different data rates. For example, signals sent by client device 12 and received by RNC 30 should be encoded and decoded at the same data rate, but that data rate may be different from the data rate used to encode and decode signals sent by RNC 30 to client device 12. In a preferred embodiment, the method may involve selecting two different actual data rates, such as one actual data rate for signals transmitted by the client device and another actual data rate for signals transmitted by the base station, but both actual data rates would be greater than or equal to the minimum threshold data rate.

Recalculating the Minimum Threshold Data Rate and the Actual Data Rate

Figure 3:
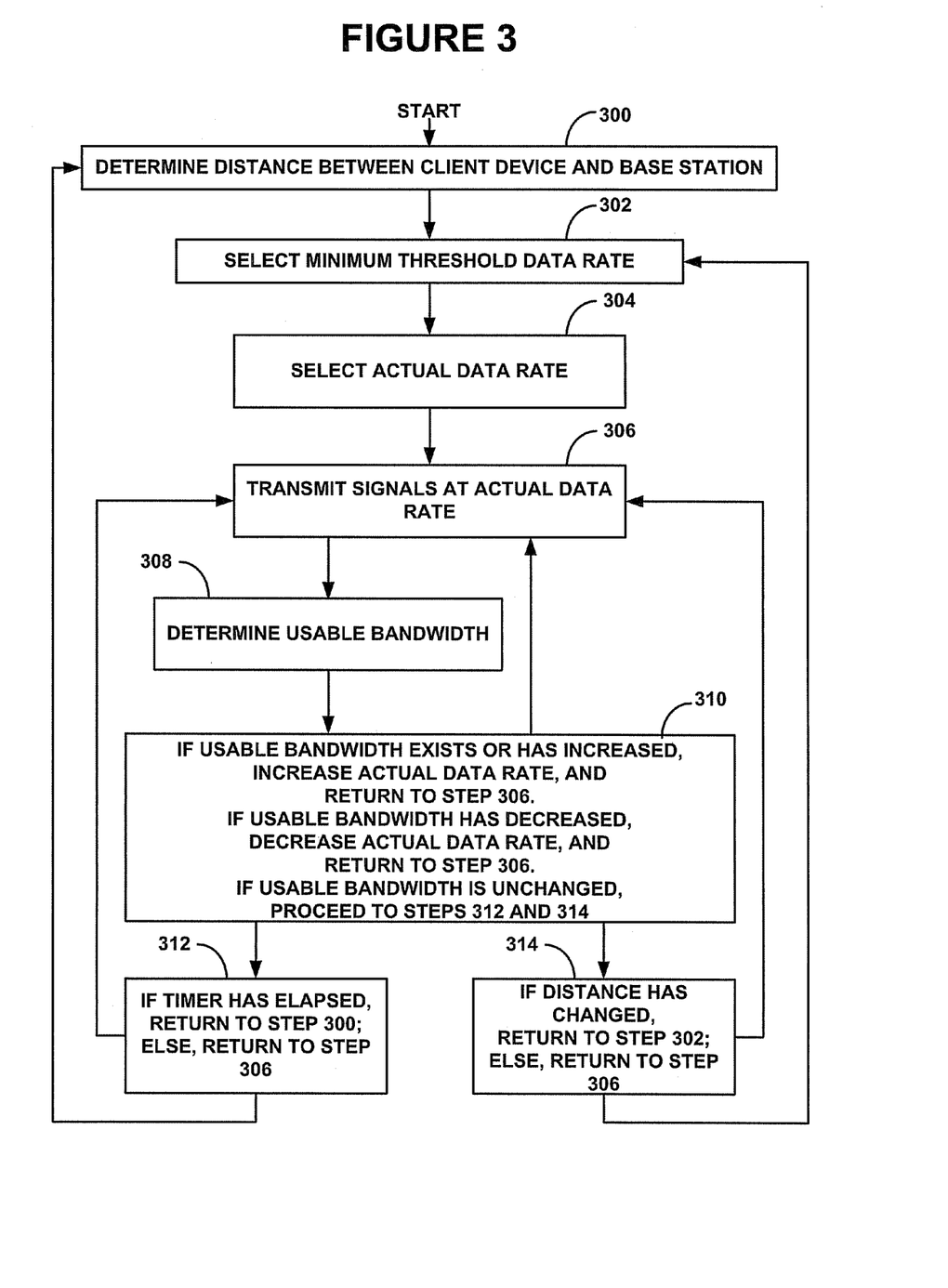
FIG. 3 is a flow diagram depicting functions carried out in accordance with another exemplary method.

FIG. 3 depicts another exemplary embodiment of the inventive method. Steps 300, 302, 304, and 306 may proceed similarly to steps described above in the context of FIG. 2. For example, the RNC may use the same distance determination methods discussed above in the context of step 200 to determine the distance between the client device and the base station in step 300. Similarly, the RNC may select the minimum threshold data rate in step 302 using any method where the minimum threshold data rate increases as the determined distance increases. As in step 204, the RNC may select the actual data rate in step 304 such that the actual data rate is not less than the minimum threshold data rate. Additionally, in step 306, signals may be transmitted between the client device and the base station at the actual data rate.

FIG. 3 depicts a preferred method in which both the actual data rate and the minimum threshold data rate may change. These changes may occur, for example, during the course of a call. Indeed, the network may have excess capacity in the form of currently unused bandwidth, and the actual data rate may be increased to take advantage of that excess capacity. For example, after signals are transmitted in step 306, the RNC may determine the unused bandwidth of the network in step 308. In step 310, if the network has unused bandwidth, the RNC may increase the actual data rate to utilize at least a portion of the unused bandwidth. The method may then return to step 306 in which the RNC may cause signals to be transmitted at the newly increased actual data rate. Step 310 operates identically if the unused bandwidth has increased since a previous determination of unused bandwidth: the RNC may increase the actual data rate in step 310, and the RNC may then cause signals to be transmitted at a newly increased actual data rate in step 306.

Alternatively, if the unused bandwidth of the network has decreased since the unused bandwidth was last determined, the RNC may decrease the actual data rate in step 310 to account for the shrunken amount of unused bandwidth of the network. In order to maintain a minimum standard of call quality, the actual data rate may never be less than the minimum threshold data rate. Accordingly, should the actual data rate be decreased in step 310, the minimum threshold data rate is the lowest value that the RNC may assign to the actual data rate, regardless of the magnitude of the decrease in the unused bandwidth of the network. If the RNC decreases the actual data rate in step 310, the method may again return to step 306, and the RNC may cause signals to be transmitted between the client device and the base station at the newly decreased actual data rate.

If, in step 310, the unused bandwidth is unchanged, the method may proceed to steps 312 and 314, which identify situations in which the minimum threshold data rate may be recalculated. FIG. 3 depicts steps 312 and 314 as executing in parallel after step 310. However, these steps may all occur in series or otherwise in combination. Steps 310, 312, and 314 are merely separated for ease of reference. Alternatively, different embodiments may include or exclude each of steps 310, 312, and 314.

In step 312, a timer may trigger a reselection of the minimum threshold data rate. For example, the time that has elapsed since the previous selection of the minimum threshold data rate may be determined. If that time is greater than a preset timer value—perhaps if the minimum threshold data rate should be recalculated every two minutes, and two minutes have elapsed since the minimum threshold data rate was selected in step 302—then the method may return to step 300. Upon return to step 300, the RNC may again determine the distance between the client device and the base station, and that newly determined distance may serve as the basis for the RNC's reselection of the minimum threshold data rate in step 302. The method may then proceed as described above, by the RNC selecting a new actual data rate and causing signals to be transmitted at the new actual data rate. If, in step 312, the timer has not elapsed, the method may return to step 306, and the RNC may continue to cause signals to be transmitted at the actual data rate.

In step 314, a distance change may trigger the reselection of the minimum threshold data rate. For example, the RNC may determine distance between the client device and the base station and may compare the newly determined distance to the originally determined distance. A discrepancy between the originally determined distance and the newly determined distance may correspond to movement by the client device relative to the base station. Preferably, no action would be taken unless the distance changed significantly, for example, unless the change in the distance is greater than some distance trigger amount. If the distance has significantly changed, the method may return to step 302, and the RNC may use the newly determined distance to reselect the minimum threshold data rate. The method may then proceed as described above, by the RNC selecting a new actual data rate and causing signals to be transmitted at the new actual data rate. If the distance has not changed (or has not changed significantly), in step 314, the method may return to step 306, and the RNC may continue to cause signals to be transmitted at the old actual data rate.

Alternatively, in step 314, the method may allow for the detection of a change in the distance rather than for a new distance determination. In this embodiment, if the RNC detects a change in the distance, the method may return to step 300 (this return is not shown in FIG. 3), rather than to step 302, so that the RNC may determine the new distance. The method may then proceed through steps 302, 304, and 306, using the newly determined distance, as described above.

Another trigger for reselecting the minimum threshold data rate, not shown in FIG. 3, may be a move by the client device that takes the client device out of the coverage area of the base station serving it. For example, in reference to FIG. 1, client device 12 may move such that it is no longer in the coverage area of BTS 24 but is instead in the coverage area of BTS 28. Such movement may correspond to client device being operable to communicate with BTS 28 over air interface 38, rather than with BTS 24 over air interface 14. Once BTS 28 serves client device 12, RNC 30 may recalculate the distance between the client device and the base station, using the distance between client device 12 and BTS 28, rather than BTS 24. This newly determined distance may be used to reselect the minimum threshold data rate, as described above. This reselection may occur regardless of whether the base station that newly serves the client device is itself served by the same RNC as or by an RNC different from that which served the old base station. However, if a new RNC serves the new base station, the new RNC, rather than the old RNC, may be the entity that reselects the minimum threshold data rate.

Exemplary embodiments of the present invention have been described above. Those skilled in the art will understand, however, that changes and modifications may be made to the embodiments described without departing from the true scope and spirit of the present invention, which is defined by the claims.

The invention claimed is:

1. A method for managing communications in a wireless network, the method comprising the following functions:
   (i) determining a distance between a client device and a base station serving the client device, wherein the base station is a component of a radio access network;
   (ii) selecting a minimum threshold data rate from among at least a first data rate and a second data rate, in accordance with an algorithm, wherein the algorithm selects the first data rate if the distance corresponds to a first value and selects the second data rate if the distance corresponds to a second value, the second value being greater than the first value and the second data rate being higher than the first data rate;
   (iii) selecting an actual data rate not less than the minimum threshold data rate; and
   (iv) causing signals to be transmitted between the client device and the base station at the actual data rate.

2. The method of claim 1, wherein the radio access network comprises a radio network controller serving the base station, and wherein causing signals to be transmitted between the client device and the base station at the actual data rate comprises the radio network controller causing the signals to be transmitted to the client device at the actual data rate.

3. The method of claim 1, wherein determining the distance between the client device and the base station comprises:
   sending a message to the client device at a first time;
   receiving a response from the client device at a second time; and
   applying a known message transmittal rate to a difference between the first time and the second time to determine the distance between the client device and the base station.

4. The method of claim 1, wherein determining the distance between the client device and the base station comprises:
   using a satellite-based location determination method to determine a location of the client device; and
   comparing the location of the client device to a known location of the base station to determine the distance between the client device and the base station.

5. The method of claim 1, further comprising:
   determining usable bandwidth of the radio access network, wherein the usable bandwidth is bandwidth available to transmit signals between the client device and the base station;

selecting a new data rate, greater than the minimum threshold data rate, such that the new data rate is not greater than the usable bandwidth; and causing signals to be transmitted between the client device and the base station at the new data rate.

6. The method of claim 5, further comprising:

detecting a change in the usable bandwidth; and responsive to the change, (a) increasing the actual data rate if the usable bandwidth has increased and causing signals to be transmitted between the client device and the base station at the increased actual data rate and (b) decreasing the actual data rate if the usable bandwidth has decreased, such that the decreased actual data rate is not less than the minimum threshold data rate, and causing signals to be transmitted between the client device and the base station at the decreased actual data rate.

7. The method of claim 1, wherein the client device is a mobile station with a vocoder, wherein the actual data rate is a vocoder sampling rate, and wherein causing signals to be transmitted between the client device and the base station at the actual data rate comprises the vocoder transmitting signals from the mobile station to the base station at the actual data rate.

8. The method of claim 1, further comprising:

recalculating the minimum threshold data rate after a time limit has elapsed since the selection of the minimum threshold data rate;

selecting a new actual data rate not less than the recalculated minimum threshold data rate; and causing signals to be transmitted between the client device and the base station at the new actual data rate.

9. The method of claim 1, further comprising:

recalculating the minimum threshold data rate when the distance between the client device and the base station has changed due to movement of the client device;

selecting a new actual data rate not less than the recalculated minimum threshold data rate; and causing signals to be transmitted between the client device and the base station at the new actual data rate.

10. The method of claim 1, wherein the base station is served by a first radio network controller, the method further comprising:

detecting a transition of the client device, wherein the transition causes the client device to be served by a new base station;

responsive to the detecting, recalculating the minimum threshold data rate;

selecting a new actual data rate not less than the recalculated minimum threshold data rate; and causing signals to be transmitted between the client device and the base station at the new actual data rate.

11. The method of claim 10, wherein the radio access network comprises a second radio network controller, and wherein the new base station is served by the second radio network controller, the method further comprising the second radio network controller causing signals to be transmitted between the client device and the new base station at the actual data rate, wherein the actual data rate is not less than the recalculated minimum threshold data rate.

12. The method of claim 1, further comprising:

detecting an attempt to set up a communication with the client device; and performing at least one of the functions (i), (ii), and (iii) in response to the detecting.

13. A method for managing communications in a wireless network comprising:

determining a distance between a client device and a base station serving the client device, wherein the base station is a component of a radio access network;

selecting a minimum threshold data rate from among at least a first data rate and a second data rate, in accordance with an algorithm, wherein the algorithm selects the first data rate if the distance corresponds to a first value and selects the second data rate if the distance corresponds to a second value, the second value being greater than the first value and the second data rate being higher than the first data rate;

determining usable bandwidth of the radio access network, wherein the usable bandwidth is bandwidth available to transmit signals between the client device and the base station;

selecting an actual data rate, not less than the minimum threshold data rate, such that the actual data rate is not greater than the usable bandwidth;

causing signals to be transmitted between the client device and the base station at the actual data rate;

detecting a change in the distance between the client device and the base station;

recalculating the minimum threshold data rate when the change in the distance is greater than a distance trigger amount;

detecting a change in the usable bandwidth of the radio access network; and recalculating the actual data rate when the change in the bandwidth is greater than a bandwidth trigger amount, such that the actual data rate is not less than the minimum threshold data rate.

14. A system comprising:

a client device with a first vocoder, wherein the first vocoder encodes signals to be transmitted by the client device and decodes signals received by the client device; and a radio access network, wherein the radio access network comprises a base station that serves the client device and a radio network controller that serves the base station, and wherein the radio network controller comprises:

(a) a second vocoder, wherein the second vocoder encodes signals to be transmitted by the base station and decodes signals received by the base station; and (b) logic configured to perform the following operations: (i) to determine a distance between the client device and the base station; (ii) to select a minimum threshold data rate from among at least a first data rate and a second data rate, in accordance with an algorithm, wherein the algorithm selects the first data rate if the distance corresponds to a first value and selects the second data rate if the distance corresponds to a second value, the second value being greater than the first value and the second data rate being higher than the first data rate; (iii) to select a first actual data rate not less than the minimum threshold data rate and a second actual data rate not less than the minimum threshold data rate; and (iv) to direct the first vocoder to transmit signals from the client device to the base station at the first actual data rate and direct the second vocoder to transmit signals from the base station to the client device at the second actual data rate.

15. The system of claim 14, wherein the logic is further configured to detect an attempt to set up communication with the client device and to responsively perform at least one of the operations (i), (ii), (iii), and (iv).

16. The system of claim 14, wherein the logic is further configured:

(v) to determine usable bandwidth of the radio access network, wherein the usable bandwidth is bandwidth available to transmit signals between the client device and the base station;

(vi) to select a new data rate, greater than the minimum threshold data rate, such that the new data rate is not greater than the usable bandwidth; and (vii) to direct at least one of the first vocoder and the second vocoder to transmit signals at the new data rate.

17. The system of claim 16, wherein the logic is further configured:

(vii) to detect a change in the usable bandwidth; and (viii) to adjust at least one of the first actual data rate and the second actual data rate (a) upwards if the usable bandwidth has increased and (b) downwards if the usable bandwidth has decreased, such that neither the first actual data rate nor the second actual data rate is less than the minimum threshold data rate.

18. The system of claim 14, wherein the logic is further configured:

(v) to recalculate the minimum threshold data rate when the distance between the client device and the base station has changed due to a movement of the client device; and (iii) to select a new first actual data rate not less than the recalculated minimum threshold data rate and a new second actual data rate not less than the recalculated minimum threshold data rate; and (iv) to direct the first vocoder to transmit signals from the client device to the base station at the new first actual data rate and direct the second vocoder to transmit signals from the base station to the client device at the new second actual data rate.

* * * * *